(12) United States Patent
Liu

(10) Patent No.: US 9,476,583 B2
(45) Date of Patent: Oct. 25, 2016

(54) RECOVERY SYSTEM OF WASTE HEAT FROM FLUE GAS

(71) Applicant: SHANGHAI FUBO EP EQUIPMENT CO., LTD., Shanghai (CN)

(72) Inventor: Bing Liu, Shanghai (CN)

(73) Assignee: SHANGHAI FUBO EP EQUIPMENT CO., LTD., Shanghai (CN)

( * ) Notice: Subject to any disclaimer, the term of this patent is extended or adjusted under 35 U.S.C. 154(b) by 177 days.

(21) Appl. No.: 14/578,476

(22) Filed: Dec. 21, 2014

(65) Prior Publication Data

US 2015/0107537 A1    Apr. 23, 2015

Related U.S. Application Data

(63) Continuation-in-part of application No. PCT/CN2013/076917, filed on Jun. 7, 2013.

(30) Foreign Application Priority Data

Jul. 6, 2012   (CN) .......................... 2012 1 0234270
Jul. 6, 2012   (CN) ..................... 2012 2 0327646 U

(51) Int. Cl.
| | |
|---|---|
| *F22B 1/18* | (2006.01) |
| *F22D 1/12* | (2006.01) |
| *F22D 1/04* | (2006.01) |
| *F22D 1/08* | (2006.01) |
| *F24H 8/00* | (2006.01) |
| *F24D 12/02* | (2006.01) |
| *F28F 21/08* | (2006.01) |
| *F28D 21/00* | (2006.01) |

(52) U.S. Cl.
CPC . *F22D 1/12* (2013.01); *F22B 1/18* (2013.01); *F22B 1/1892* (2013.01); *F22D 1/04* (2013.01); *F22D 1/08* (2013.01); *F24D 12/02* (2013.01); *F24H 8/00* (2013.01); *F28D 21/001* (2013.01); *F28F 21/082* (2013.01); *F24D 2200/18* (2013.01); *Y02B 30/14* (2013.01)

(58) Field of Classification Search
CPC ...... F22B 1/18; F22B 1/1861; F22B 1/1815; F02G 5/02
USPC ....................................................... 122/7 R
See application file for complete search history.

(56) References Cited

U.S. PATENT DOCUMENTS

2016/0040549 A1* 2/2016 Bruckner .............. F01K 23/105
60/616

FOREIGN PATENT DOCUMENTS

| CN | 201555208 U | * | 8/2010 |
| CN | 202532512 U | * | 11/2012 |
| CN | 101629713 A | * | 2/2016 |

*Primary Examiner* — Gregory A Wilson
(74) *Attorney, Agent, or Firm* — Matthias Scholl, PC; Matthias Scholl

(57) ABSTRACT

A recovery system of waste heat from flue gas. The system includes a first heat exchanger and a second exchanger. The first heat exchanger includes a heat absorption section, a heat release section, and a first pipeline. The second heat exchanger includes a second pipeline including an inlet header and an outlet header. The system further includes a third pipeline. The first heat exchanger is disposed at a relatively high temperature side of a flue, the second heat exchanger is disposed at a relatively low temperature side of the flue, and the first heat exchanger and the second heat exchanger are connected by the third pipeline. The heat absorption section and the heat release section are connected by the first pipeline to form a circulation loop; the heat absorption section is disposed in the flue; the heat release section is disposed in the third pipeline.

9 Claims, 1 Drawing Sheet

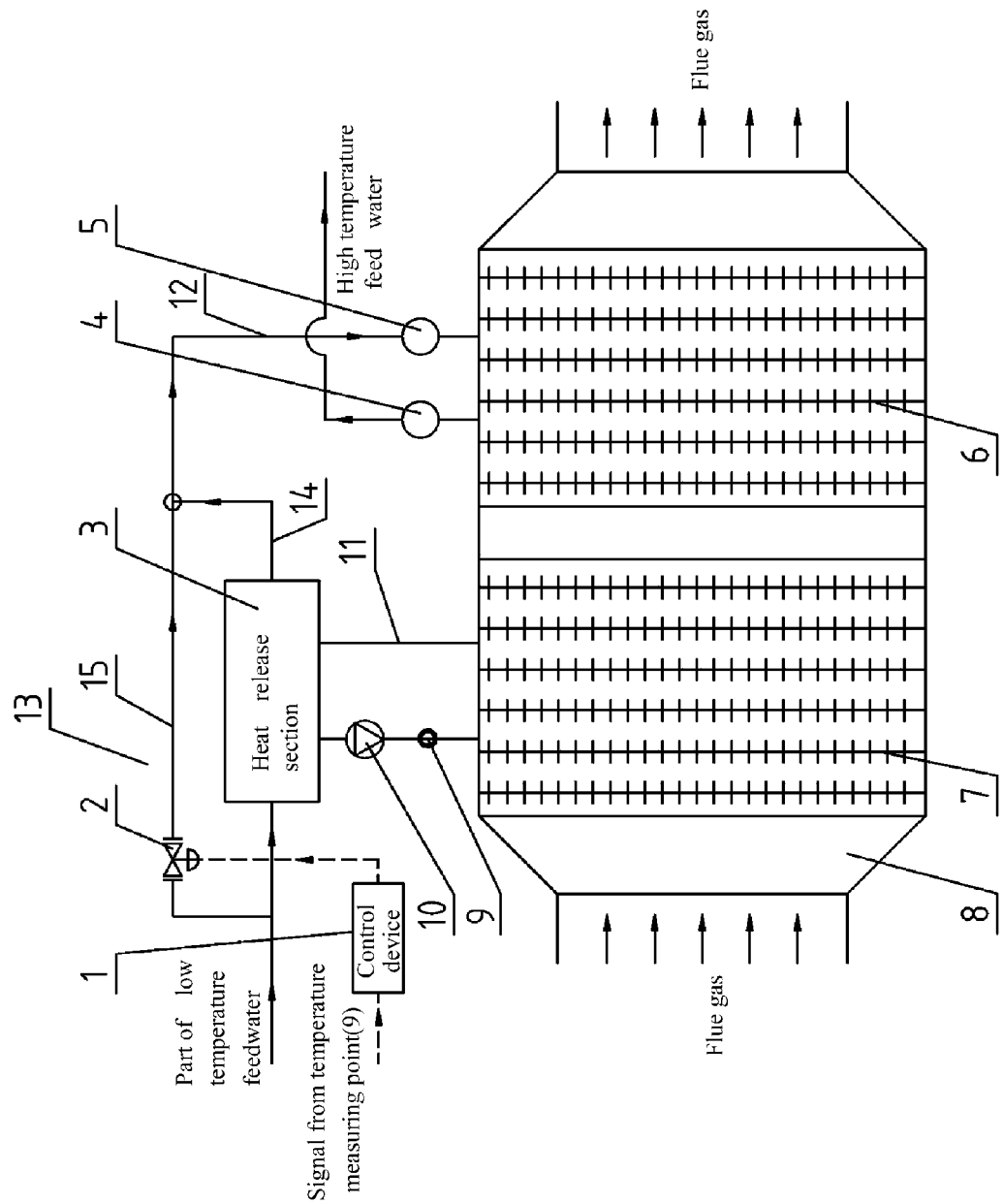

US 9,476,583 B2

RECOVERY SYSTEM OF WASTE HEAT FROM FLUE GAS

CROSS-REFERENCE TO RELATED APPLICATIONS

This application is a continuation-in-part of International Patent Application No. PCT/CN2013/076917 with an international filing date of Jun. 7, 2013, designating the United States, now pending, and further claims priority benefits to Chinese Patent Application No. 201210234270.X filed Jul. 6, 2012, and to Chinese Patent Application No. 201220327646.7 filed Jul. 6, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a recovery system of waste heat from flue gas.

2. Description of the Related Art

In general, the exhaust temperature of the boiler is often controlled to be 140-160° C. To improve the desulfurization efficiency and protect the desulfurizing tower, the exhaust temperature is required to be further decreased to less than 60° C., which means that a lot of heat has to be wasted.

For the benefit of environmental protection, the waste heat is often recycled to heat the feedwater for the boiler. Conventional waste heat recycling devices include low pressure economizers, heat pipe heat exchangers, and phase change heat exchangers.

However, the above three heat exchange technologies all require the wall temperature of the heat exchanger to be more than the acid dew point temperature of the flue gas so as to prevent the devices from corrosion. If the acid dew point temperature of the flue gas is 80° C., to ensure a safety margin, the final exhaust temperature should exceed 100° C.

SUMMARY OF THE INVENTION

In view of the above-mentioned problems, it is an objective of the invention to provide a recovery system of waste heat from flue gas. The feedwater to be heated is uniflow. A first heat exchanger heats cold water, the preheated cold water is then heated by a second heat exchanger, so that the cold water is first heated by the high temperature flue gas and then heated by the low temperature flue gas. The entire flow path is uniflow, which benefits the temperature drop of the flue gas.

To achieve the above objective, in accordance with one embodiment of the invention, there is provided a recovery system of waste heat from flue gas, the system comprising a first heat exchanger, a second exchanger, and a third pipeline. The first heat exchanger comprises a heat absorption section, a heat release section, and a first pipeline. The second heat exchanger comprises a second pipeline comprising an inlet header and an outlet header. The first heat exchanger is disposed at a relatively high temperature side of a flue, the second heat exchanger is disposed at a relatively low temperature side of the flue, and the first heat exchanger and the second heat exchanger are connected by the third pipeline. The heat absorption section and the heat release section are connected by the first pipeline to form a circulation loop; the heat absorption section is disposed in the flue; the heat release section is disposed in the third pipeline. A medium to be heated is introduced to the second exchanger along the third pipeline and the inlet header in sequence for heat exchange, and flows out from the outlet heater of the second exchanger.

In a class of this embodiment, the third pipeline comprises a first branch and a second branch which are connected in parallel; the heat release section of the first heat exchanger is disposed in the first branch; and the second branch is configured to regulate a flow rate of the medium.

In a class of this embodiment, a regulating valve is disposed on the second branch of the third pipeline, and the regulating valve is controlled by a control device.

In a class of this embodiment, a temperature measuring point is disposed on the first pipeline connecting the heat absorption section and the heat release section, and the temperature measuring point transmits a temperature signal to the control device.

The recovery system comprises the first heat exchanger and the second heat exchanger. The first heat exchanger is disposed at a relatively high temperature side of a flue, and the flue gas first exchanges heat energy with the first heat exchanger; the second heat exchanger is disposed at a relatively low temperature side of the flue.

The first heat exchanger comprises a heat absorption section and a heat release section. The heat absorption section is disposed in the flue following the dust cleaner of the boiler, for absorbing the waste heat of the flue gas. The heat absorption section and the heat release section are connected by the first pipeline to form a circulation loop. A circulating pump is disposed on the first pipeline which is filled with forced circulating water.

The medium to be heated (i.e., the low temperature feedwater) is first heated by the first heat exchanger in the heat release section. The second branch is provided with a regulating valve for regulating the flow rate. The heated feedwater and the branch feedwater are mixed and transported to the second heat exchanger for heat exchange.

The second heat exchanger, which is an economizer, comprises the inlet header and tube bundles. The heat release section of the first heat exchanger and the second branch are connected to the inlet header of the second heat exchanger, and then to the tube bundles of the second heat exchanger. The feedwater to be heated in the pipelines exchanges heat with the flue gas outside the pipelines. The tube bundles of the second heat exchanger contacting with flue gas is made of corrosion resisting steel or plain carbon steel.

The control system of the invention comprises a control device and a temperature measuring point disposed at the outlet of the circulating pump. The temperature measuring point transmits a temperature signal to the control device. The control device controls the opening of the regulating valve according to the temperature signal to regulate the flow rate of the feedwater.

BRIEF DESCRIPTION OF THE DRAWINGS

The invention is described hereinbelow with reference to accompanying drawings, in which the sole FIGURE is a schematic diagram of a recovery system of waste heat from flue gas in accordance with one embodiment of the invention.

In the drawings, the following reference numbers are used: 1. Control device; 2. Regulating valve; 3. Heat release section of first heat exchanger; 4. Outlet header of second heat exchanger; 5. Inlet header of second heat exchanger; 6. Tube bundles of second heat exchanger; 7. Heat absorption section of first heat exchanger; 8. Flue; 9. Temperature measuring point; 10. Forced circulating water; 11. First pipeline; 12. Second pipeline; 13. Third pipeline; 14. First branch; 15. Second branch.

DETAILED DESCRIPTION OF THE EMBODIMENTS

As shown in the sole FIGURE, a recovery system of waste heat from flue gas comprises a first heat exchanger, a second exchanger, and a third pipeline 13. The first heat exchanger comprises a heat absorption section 7, a heat release section 3, and a first pipeline 11. The second heat exchanger comprises a second pipeline 12 comprising an inlet header 5 and an outlet header 4. The first heat exchanger is disposed at a relatively high temperature side of a flue 8, the second heat exchanger is disposed at a relatively low temperature side of the flue 8, and the first heat exchanger and the second heat exchanger are connected by the third pipeline 13. The heat absorption section 7 and the heat release section 3 are connected by the first pipeline 11 to form a circulation loop. The heat absorption section 7 is disposed in the flue 8. The heat release section 3 is disposed in the third pipeline 13. The medium to be heated is introduced to the second exchanger along the third pipeline 13 and the inlet header 5 in sequence for heat exchange, and flows out from the outlet header 4 of the second exchanger. The third pipeline 13 comprises a first branch 14 and a second branch 15 which are connected in parallel. The heat release section 3 of the first heat exchanger is disposed in the first branch 14; and the second branch 15 is configured to regulate a flow rate of the medium. A regulating valve 2 is disposed on the second branch 15 of the third pipeline 13, and the regulating valve 2 is controlled by a control device 1.

A temperature measuring point 9 is disposed on the first pipeline 11 connecting the heat absorption section 7 and the heat release section 3, and the temperature measuring point 9 transmits a temperature signal to the control device 1. The first pipeline 11 of the first heat exchanger is filled with forced circulating water. A circulating pump 10 is disposed on the first pipeline 11. The first branch 14 and the second branch 15 of the third pipeline are filled with low temperature feedwater supplied for a boiler. The tube bundles 6 of the second heat exchanger contacting with flue gas is made of corrosion resisting steel or plain carbon steel.

In combination with the accompanying drawing, the working principle of the recovery system is illustrated as follows. To reduce the temperature of the flue gas introduced to desulfurization equipment as much as possible and recycle the waste heat of the flue gas, the system of the invention comprises the first heat exchanger and the second exchanger, that is to say, the waste heat is recycled in two stages. The first heat exchanger is configured to preliminarily heat the low temperature feedwater for a boiler. The heated feedwater is mixed with the feedwater from the second branch 15, and exchanges heat with the flue gas in the second heat exchanger which functions as an economizer, for heat recovery and reducing the temperature of the flue gas introduced to desulfurization equipment.

The following illustrates the anticorrosion mechanism of the recovery system comprising two heat exchangers. Presume the temperature of the flue gas from an air pre-heater of a boiler is 125° C., which is decreased to 120° C. after dust removal. Presume the acid dew point of the flue gas is 90° C., the water dew point thereof is 45° C., and the demineralized feedwater to be introduced to a low pressure heater (or deaerator) has a temperature of 40° C. Conventionally, the 120° C. flue gas from a dust cleaner is directly introduced to desulfurization equipment for desulfurization, which wastes much heat.

Based on the recovery technology in the art, the recovery of waste heat of the flue gas pays more attention to the wall temperature of the heat exchanger, that is, to control the wall temperature to be greater than the acid dew point. Thus, when the acid dew point of the flue gas is 90° C., take the heat transfer temperature difference into account, the discharged flue gas should have a temperature of 110° C. That is to say, the temperature drop is only about 10° C., which results in a bad energy saving effect.

In the example, two heat exchangers are provided. The first heat exchanger, which comprises the heat absorption section 7 and the heat release section 3, preheats the 40° C. demineralized feedwater. The heat absorption section 7 absorbs the waste heat of the flue gas and transfer the thermal energy to the forced circulating water. The forced circulating water releases and transfers the thermal energy at the heat release section 3 to the 40° C. demineralized feedwater. The flow rate of the demineralized feedwater is controlled by regulating the regulating valve 2 on the second branch 15, which indirectly controls the heat transfer capacity in the heat release section 3 of the first heat exchanger. Accordingly, the temperature of the forced circulating water in the circulation loop formed by the heat release section 3 and the heat absorption section 7 is controlled, thereby preventing the heat absorption section 7 from acid erosion. As mentioned above, the maximum energy saving scope in the first heat exchanger is about 10° C. temperature drop, and the discharged flue gas has a temperature about 110° C.

Thus, part of the 40° C. demineralized feedwater is heated. Through appropriate regulation, the mixed demineralized feedwater can be controlled to, for example, 45° C. If the water dew point of the flue gas is 42° C., the flow rate in the branch can be increased, so that the heat exchange in the heat release section 3 decreases, and the exhaust temperature in the heat absorption section 7 of the first exchanger will exceed or be equal to 110° C.

The temperature of the mixed demineralized feedwater from the first heat exchanger is basically equal to the water dew point of the flue gas, 45° C. The mixed feedwater is introduced to the second heat exchanger for heat exchange with the flue gas (it is should be noted that the flow medium temperature in the inlet header 5 should be equal to the water dew point of the flue gas). The wall temperature of the second heat exchanger (just like an economizer) is about the temperature of the mixed demineralized feedwater plus 5° C., that is, the wall temperature is about 50° C., which is higher than the water dew point of the flue gas. If the flue gas is decreased to 70° C., the heat exchange can ensure the demineralized feedwater temperature to increase by 20° C. So, the outlet temperature of the demineralized feedwater is 65° C. Although the wall temperature of the second heat exchanger is between 50 and 70° C., which prevents the acid erosion around the water dew point, the wall temperature may fall within the scope of 23-30° C. below the acid dew point of the flue gas, which results in serious erosion. To avoid the problems, the tube bundles of the second heat exchanger 6 are made of corrosion resisting steel, or based on the boiler type, the acid dew point and the water dew point of the flue gas, to regulate the total energy saving.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A recovery system of waste heat from flue gas, the system comprising:
   a) a first heat exchanger, the first heat exchanger comprising a heat absorption section, a heat release section, and a first pipeline;
   b) a second exchanger, the second heat exchanger comprising a second pipeline comprising an inlet header and an outlet header; and
   c) a third pipeline;
   wherein
   the first heat exchanger is disposed at a relatively high temperature side of a flue, the second heat exchanger is disposed at a relatively low temperature side of the flue, and the first heat exchanger and the second heat exchanger are connected by the third pipeline;
   the heat absorption section and the heat release section are connected by the first pipeline to form a circulation loop; the heat absorption section is disposed in the flue; the heat release section is disposed in the third pipeline; and
   when in use, a medium to be heated is introduced to the second exchanger along the third pipeline and the inlet header in sequence for heat exchange, and flows out from the outlet heater of the second exchanger.

2. The system of claim 1, wherein the third pipeline comprises a first branch and a second branch which are connected in parallel; the heat release section of the first heat exchanger is disposed in the first branch; and the second branch is configured to regulate a flow rate of the medium.

3. The system of claim 2, wherein a regulating valve is disposed on the second branch of the third pipeline, and the regulating valve is controlled by a control device.

4. The system of claim 3, wherein a temperature measuring point is disposed on the first pipeline connecting the heat absorption section and the heat release section, and the temperature measuring point transmits a temperature signal to the control device.

5. The system of claim 4, wherein tube bundles of the second heat exchanger contacting with flue gas comprises plain carbon steel.

6. The system of claim 1, wherein when in use, the first pipeline of the first heat exchanger is filled with forced circulating water.

7. The system of claim 1, wherein when in use, the medium to be heated is low temperature feedwater supplied for a boiler.

8. The system of claim 1, wherein tube bundles of the second heat exchanger contacting with flue gas comprises corrosion resisting steel.

9. The system of claim 1, wherein tube bundles of the second heat exchanger contacting with flue gas comprises plain carbon steel.

* * * * *